United States Patent

[11] 3,581,971

| [72] | Inventor | Bernhard A. Zinkgraf |
| --- | --- | --- |
|  |  | Prospect Heights, Ill. |
| [21] | Appl. No. | 817,025 |
| [22] | Filed | Apr. 17, 1969 |
| [45] | Patented | June 1, 1971 |
| [73] | Assignee | Kraftco Corporation |
|  |  | New York, N.Y. |

[54] PACKAGE FOR FROZEN DAIRY DESSERTS
4 Claims, 6 Drawing Figs.

| [52] | U.S. Cl. | 229/3.5, |
| --- | --- | --- |
|  |  | 99/180, 206/46, 229/87 |
| [51] | Int. Cl. | B65d 1/00, |
|  |  | A23g 3/00 |
| [50] | Field of Search | 229/3.5, |
|  |  | 2.5; 206/46; 99/180 |

[56] References Cited
UNITED STATES PATENTS

| 797,775 | 8/1905 | Lustig | (206/ICC DIG) |
| --- | --- | --- | --- |
| 2,019,740 | 11/1935 | Starkey | (206/ICC DIG) |
| 2,033,238 | 3/1936 | Geyer et al. | (206/ICC DIG) |
| 2,355,559 | 8/1944 | Renner | 229/3.5(MF)(UX) |
| 2,649,067 | 8/1953 | Kranenberg | 229/3.5(MF)UX |
| 2,845,209 | 7/1958 | Bruun | 229/4.5 |
| 2,890,122 | 6/1959 | Katon | 229/2.5X |
| 2,956,677 | 10/1960 | Kavadlo et al. | 229/3.5(MF)UX |
| 3,000,526 | 9/1961 | Ford | 229/3.5(MF)UX |

*Primary Examiner*—Davis T. Moorhead
*Attorney*—Anderson, Luedeka, Fitch, Even & Tabin ABSTRACT: A package for frozen dairy desserts and a method of manufacture of the package are provided. The package is prepared from a sheet of metal foil. The sheet of metal foil has a pocket formed therein which includes extra sheet material and causes an irregular surface inside the package. The shape of the package establishes the shape desired in a finished frozen dairy dessert in a fluid or semifluid condition and the dairy dessert is hardened. The dairy dessert is then readily released from the package by pulling opposite edge portions of the pocket.

PATENTED JUN 1 1971

3,581,971

INVENTOR
BERNHARD A. ZINKGRAF

Anderson, Luedeka, Fitch, Even, & Tabin
ATTYS.

PACKAGE FOR FROZEN DAIRY DESSERTS

The present invention relates generally to a package and a method for handling frozen dairy desserts in controlled amounts of food material and more particularly, it relates to a method for making and handling portion collected amounts of frozen dairy desserts in a desired shape.

Ice cream is a well-known frozen dairy dessert that is customarily served by scooping the ice cream from a bulk container in the general shape of a hemisphere. Such hemispherical shape for ice cream is well known by the consumer and is the shape which the consumer is accustomed to being served.

It is known to slice hardened ice cream into generally rectangular shapes and wrap the slices. Such packages of ice cream greatly facilitate the serving of ice cream by large institutional users. However, the rectangular shape of ice cream is not always the most desirable form in which to serve ice cream.

It is known to scoop out ice cream and wrap the prefrozen ice cream scoops in overwraps. This is laborious and time consuming. Furthermore, the ice cream often sticks to the wrapping material and is frequently difficult to remove.

It would be desirable to provide portion controlled packages of ice cream in a shape which closely resembles that of scooped ice cream, i.e., a hemispherical shape, and from which packages the ice cream can be readily removed. It would also be desirable to provide a method for packaging portion controlled amounts of ice cream in various desired shapes without first hardening the ice cream. The institutional user is particularly interested in a readily dispensable product with minimum waste.

As stated above, it is known to provide ice cream in slices of rectangular or square shape. It is, of course, also known to package ice cream in containers from which the ice cream can be consumed, such as in cups. However, it would be desirable to provide a method for making and handling ice cream in other shapes such as the shape of scooped ice cream which shapes may be readily formed and may be easily served.

Accordingly, it is an object of the present invention to provide an improved package and method for handling frozen dairy desserts. It is another object of the invention to provide an improved package and a method for handling ice cream. It is a further object of the invention to provide package and a method for packaging portion controlled amounts of dairy dessert in a desired shape prior to hardening which shape can be readily removed from the packaging material after hardening. It is a still further object of the present invention to provide a package and a method for handling frozen dairy desserts in portion controlled amounts which package and method permits the ice cream to be readily removed from the package with minimum waste.

These and other objects of the present invention will become more apparent from the following detailed disclosure and the accompanying drawings wherein.

Figure 3:
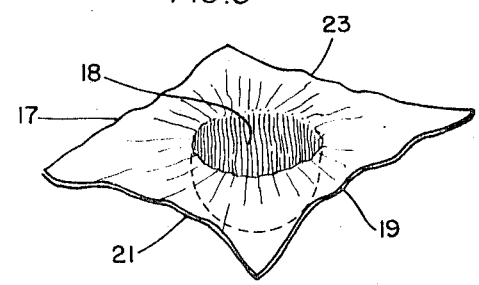
Figure 4:
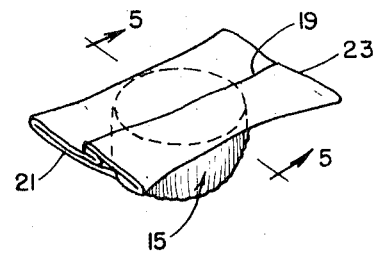
FIG. 4 is perspective view of a package showing various features of the invention.
Figure 6:
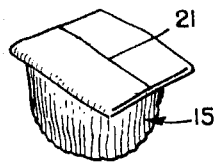
FIG. 6 is a perspective view of a package showing additional features of the invention.

The package of the invention is a frozen dairy dessert package comprising a sheet of metal foil wrapping material 11. The sheet of wrapping material is preformed to provide a pocket 15 of desired shape in the wrapping material with oppositely disposed pairs of edge portions 17, 19 and 21, 23 extending outwardly from the pocket. One of the opposite pairs of edge portions 17 and 19 may be folded over the contents of the pocket as shown in FIG. 4. The other pair of edge portions 21 and 23 may also be folded over to cover the edge portions 17 and 19, as shown in FIG. 6. The pocket is of particular conformation in order to be functional in the packaging of unhardened dairy desserts. In this connection, the interior surface is irregular, as shown in FIG. 3, and such irregularity permits release of the frozen dessert from the pocket with minimum waste of product. The irregularity results from inclusion of extra sheet material which facilitates removal of the frozen dairy dessert from the package. Thus, the conformation of the pocket 15 provided in the sheet material 11 is a highly important feature of this invention.

The method of the invention relates to the manufacture of frozen dairy dessert packages. In accord with the method, a sheet of metal foil 11 is provided. The sheet is formed, such as by the apparatus 10, so as to form a pocket 15 therein, which includes extra sheet material and causes an irregular surface inside the pocket. The shape of the pocket 15 establishes the shape desired in a finished frozen dairy dessert. The pocket 15 is formed with sufficient sheet material so that opposing pairs of edge portions 17, 19 and 21, 23 are retained around the periphery of the pocket. Thereafter, the pocket is filled with dairy dessert in fluid or semifluid condition from a freezer and at least one of the opposing pairs of edge portions are overlapped in an area extending across the surface of the material. The dairy dessert is then hardened. In accord with the invention, the pocket 15 is unveiled and opposite edge portions are pulled causing the dairy dessert to drop from the pocket. There is ready separation from the sheet material and minimum adherence of the dairy dessert to the sheet material.

The package and method of the present invention are particularly adapted for forming portion controlled amounts of ice cream into desired irregular shapes. However, it will be readily understood by one skilled in the art that the method and package of the invention may be adapted to other dairy desserts, such as sherbets, ice milk and the like.

Figure 1:
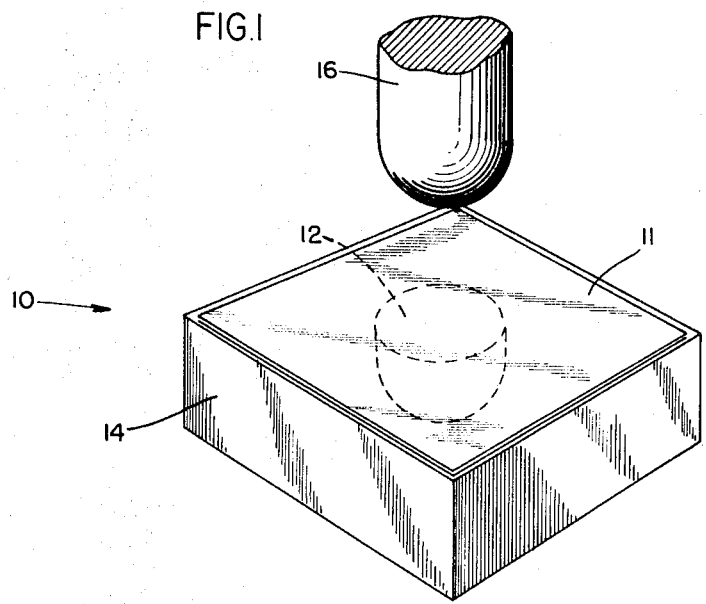
FIG. 1 is a perspective view of apparatus for preparing a package in accordance with the invention.
Figure 2:
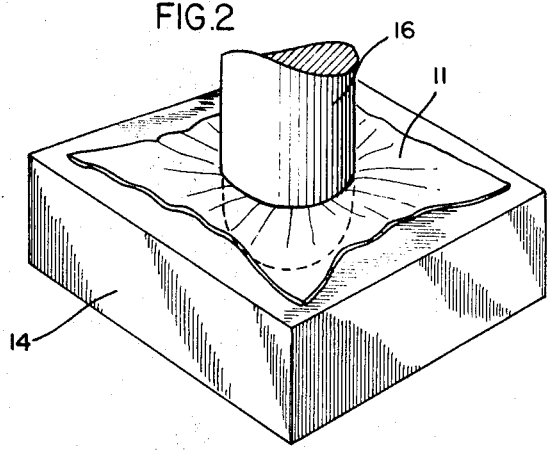
FIGS. 2 and 3 depict successive steps in the preparation of the package of the invention.

Referring now to FIGS. 1, 2, 3 and 4, the package and method of the invention will be explained in greater detail. As may be seen in the drawings, the package is in the form of a sheet of metal foil having a pocket 15 preformed herein. The pocket 15 may be formed in the sheet by any suitable apparatus. For example, as shown in FIGS. 1 and 2, the sheet 11 may be placed over a cavity 12 in a block 14 and the foil forced into the cavity by a piston 16 which conforms generally to the configuration of the cavity 12. As the sheet of metal foil is gathered into the cavity 12 by the piston 16, the metal foil is caused to form an irregular interior surface 18 which is wrinkled or crinkled. Such gathering and surface formation is highly functional in the packaging of the diary dessert, and the irregular surface 18 on the inside of the pocket 15 serves to aid in release of material from the pocket 15 formed in the metal foil and in minimizing adherence of the dairy dessert to the sheet even under frozen conditions.

The ratio of the total area of material of the sheet 11 forming the pocket to the surface area of the pocket should be at least about 1.1:1 and is desirably greater than about 1.2:1 in order to provide the desired effect. It is not usually feasible, however, to have ratios of greater than about 1.5:1.

It is also important to note that in forming the pocket 15, portions of the sheet material overlap the top around the rim of the pocket so that more material is provided at the rim than is necessary to provide the circumference of the rim. Thus, when the edge portions are pulled, the rim enlarges, which also facilitates removal of the frozen dairy dessert.

Any suitable metal foil may be used in the invention. A particularly preferred metal foil is one produced from aluminum. Aluminum foils are readily available, and are adapted for use in contact with food surfaces.

The metal foil may be coated on either or both surfaces with various materials to further provide additional features, such as preservation or sealing.

Figure 5:
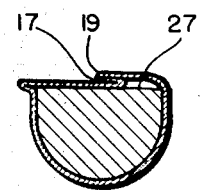
FIG. 5 is a cross-sectional view taken along line 5-5 of FIG. 4.

After the pocket 15 is filled with the fluid or semifluid dairy dessert, the portions of metal foil which remain around the periphery of the pocket are folded over the surface of the ice cream in an area extending across the surface of the dairy dessert shown in FIGS. 4 and 5. Opposing edge portions 17 and 19 may be folded over the surface of the ice cream 27 as shown in FIG. 4. Then the edge portions 21 and 23 may be folded inwardly over the pocket 15, as shown in FIG. 6. As seen in FIG. 5, the lowermost edge portion 17 may be doubled back upon itself so as to prevent the edge of the aluminum foil from becoming embedded in the surface of the dairy dessert. The doubled back portion extends along the entire length of the edge portion 17.

The edge portions 17 and 19 cover the surface of the dairy dessert and provide a completely packaged preshaped portion controlled amount of material.

As seen in FIG. 4, after folding the edge portions 17 and 19, the edge portions 21 and 23 extend outwardly from the filled pocket 15 of the ice cream package 11. These edge portions may be crimped to provide a seal, although such crimping is not considered necessary. If a metal foil of suitable rigidity is selected, the extended edge portions 21 and 23 are sufficiently rigid to provide a convenient handle for the ice cream package 11. The handle provided by the extended edge portions 21 and 23 provide convenient means for handling the ice cream package during freezing and overwrapping steps after filling of the pocket 15.

If the handles provided by the extended edge portions 21 and 23 are considered too space consuming they may be folded as before indicated and as shown in FIG. 6.

After the pocket has been filled and covered or sealed, the portion controlled package of dairy dessert is subjected to temperatures so as to harden the product. Such hardening is a well-known practice in the ice cream industry to provide the desired texturizing of the dairy dessert. In general, hardening is effected by placing ice cream in a cold room at a temperature of about −30° F. for a period of about 24 hours.

Release of the frozen dairy dessert is easily effected by folding open the overlapped edge portions 17 and 19 of the package shown in FIG. 4. The package is inverted and the edge portions 17 and 19 are pulled outwardly in opposite directions. Such pulling serves to disgorge the frozen dairy dessert from the pocket. The frozen dairy dessert is readily released from the package and there is minimum adherence of dairy dessert to the packaging material. By this method, a large user of ice cream, such as a restaurant, may easily unpackage and quickly serve a large number of portion controlled servings of ice cream in a shape that is desirable with low labor cost.

It has been found that the dairy dessert may be more easily released from the package of the invention if the temperature of the package at the time of release is above at least about −5° F. It is not necessary that a layer of melted or fluid material be formed adjacent the sheet material but the temperature of the body of the package is desirably above the indicated temperature. When a temperature below about −20° F. is maintained at the interface of the dairy dessert and the packaging material, it is sometimes difficult to cause release of the dairy dessert. The temperature above which easy release may be effected will vary somewhat with the particular dairy dessert formulation.

The following example illustrates various of the features of the invention, but is intended to in no way limit the scope of the invention, which is defined in the appended claims.

EXAMPLE

Portion controlled amounts of ice cream were prepared in accordance with the method of the invention in the following manner:

A sheet 13 of aluminum foil which measured 9-¼ inches by 6 inches was prepared. The sheet was centered over a hemispherical cavity 12 which had been formed in a block of wood and which had a diameter of 2½ inches and a surface area of 13.5 square inches. The sheet was forced downwardly into the cavity 12 by a piston 16 which had a hemispherical end of slightly smaller diameter than the cavity so as to form a pocket 15. The aluminum foil was gathered into the cavity to provide a pocket with a crumpled surface and the ratio of material in the pocket to the surface area of the pocket was 1.2:1. At the same time, the sheet was gathered at the rim of the pocket 15 so that more material was at the rim than was required to establish the circumference of the rim of the pocket and the sheet material overlapped itself around the rim. The edge portions of the sheet which extended beyond the periphery of the pocket extended outwardly from the rim of the pocket.

The aluminum foil sheet, having the pocket 15 formed therein, was then filled with ice cream directly from an ice cream freezer. The ice cream was viscous, but fluid enough to completely fill the pocket formed in the sheet of the aluminum foil. An edge portion of the aluminum foil was then folded over the flat surface of the ice cream in the pocket. This edge was bent back to form a seam and the opposite edge portion was folded over the seam. The ends which were not folded over were crimped so as to form a sealed portion controlled package of ice cream with a relatively flat top surface.

A plurality of such portion controlled packages were then placed in a cardboard container resting on the substantially flat surface. After the cardboard carton had been filled with the portion controlled packages of ice cream, the carton was placed in a cold room at a temperature of −40° F. for 24 hours.

The cardboard carton was then removed from the cold room and the portion controlled packages were removed from the carton. The packages were allowed to warm until the temperature of the ice cream reached −5° F. The ice cream was easily removed from the package by opening the sealed edge of the portions, grasping opposing edges of the aluminum foil covering the package and pulling the edge portions apart. This caused the overlapping of the metal foil at the rim and in the pocket to spread and readily release the ice cream contained in the pocket.

The ice cream, in the shape of a hemisphere or scoop, was released into a dish and closely resembled ice cream which is obtained by conventional scooping of bulk ice cream.

Various of the features of the invention are defined in the appended claims.

What I claim is:

1. A package for a portion-controlled amount of frozen dairy dessert in a desired shape and for providing easy release of the dairy dessert when frozen, comprising a sheet of metal foil having a pocket formed therein of overlapping, nonfused portions of said metal foil, said pocket conforming to the desired shape and said pocket having an irregular, wrinkled surface of metal foil, the ratio of the total area of said metal foil sheet used in forming said pocket to the surface area of said pocket being at least about 1.1:1.

2. A package in accordance with claim 1 wherein said sheet of metal foil is aluminum.

3. A package in accordance with claim 1 wherein opposing pairs of edge portions are provided around said pocket.

4. A package in accordance with claim 1 wherein said pocket is generally hemispherical in shape.

UNITED STATES PATENT OFFICE
CERTIFICATE OF CORRECTION

Patent No. 3,581,971              Dated June 1, 1971

Inventor(s)   Bernhard A. Zinkgraf

It is certified that error appears in the above-identified patent and that said Letters Patent are hereby corrected as shown below:

Column 1, line 6, "collected" should read -- controlled --; line 44, after "provide" insert -- a --; line 60, after "is" insert -- a --. In the Abstract, line 7, after "dessert" insert -- . The pocket is filled with a dairy dessert --.

Signed and sealed this 8th day of February 1972.

(SEAL)
Attest:

EDWARD M. FLETCHER, JR.              ROBERT GOTTSCHALK
Attesting Officer                    Commissioner of Patents